(12) United States Patent
Schilling et al.

(10) Patent No.: US 12,545,091 B2
(45) Date of Patent: Feb. 10, 2026

(54) ENERGY STORE FLOOR ASSEMBLY FOR AN ELECTRICALLY DRIVABLE MOTOR VEHICLE

(71) Applicant: Bayerische Motoren Werke Aktiengesellschaft, Munich (DE)

(72) Inventors: Rudolf Schilling, Ergolding (DE); Manuel Schurz, Landshut (DE); Thomas Wolff, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 321 days.

(21) Appl. No.: 18/037,800

(22) PCT Filed: Dec. 15, 2021

(86) PCT No.: PCT/EP2021/085853
§ 371 (c)(1),
(2) Date: May 19, 2023

(87) PCT Pub. No.: WO2022/129147
PCT Pub. Date: Jun. 23, 2022

(65) Prior Publication Data
US 2024/0010063 A1    Jan. 11, 2024

(30) Foreign Application Priority Data

Dec. 17, 2020   (DE) .................. 10 2020 133 961.5

(51) Int. Cl.
*B60K 1/04* (2019.01)
*B62D 21/02* (2006.01)
(Continued)

(52) U.S. Cl.
CPC ............... *B60K 1/04* (2013.01); *B62D 21/02* (2013.01); *H01M 50/249* (2021.01);
(Continued)

(58) Field of Classification Search
CPC ............. B60K 1/04; B60K 2001/0438; B60K 2001/0455; B60K 2001/0472;
(Continued)

(56) References Cited

U.S. PATENT DOCUMENTS 12,128,750 B2 * 10/2024 Amsz ................. B62D 25/2072
2009/0152034 A1 * 6/2009 Takasaki ................. B60L 50/52
180/68.5

(Continued)

FOREIGN PATENT DOCUMENTS

DE   10 2011 113 238 A1   4/2012
DE   10 2017 118 120 A1   2/2019
(Continued)

OTHER PUBLICATIONS

CN210533618U and English translation; May 15, 2020; Zhao et al. (Year: 2025).*
(Continued)

Primary Examiner — Roger L Pang
(74) Attorney, Agent, or Firm — Crowell & Moring LLP

(57) ABSTRACT

An energy store floor assembly for an electrically drivable motor vehicle includes a floor assembly with respective cross members, which extend between respective side sills and on the underside of which a vehicle floor is arranged, and an electrical energy store device, which is arranged under the vehicle floor and is accommodated in a multi-part store housing. To create an energy store floor assembly which is particularly lightweight and easy to produce, a housing upper part of the store housing forms the vehicle floor of the floor assembly, which is connected to at least one housing lower part via at least one gas-tight connection to form the store housing, which is fastened to the floor assembly on the underside of the cross members.

9 Claims, 4 Drawing Sheets

(51) Int. Cl.
   *H01M 50/249* (2021.01)
   *H01M 50/262* (2021.01)
   *B62D 25/20* (2006.01)

(52) U.S. Cl.
   CPC ... *H01M 50/262* (2021.01); *B60K 2001/0438* (2013.01); *B60K 2001/0472* (2013.01); *B62D 25/20* (2013.01); *H01M 2220/20* (2013.01)

(58) Field of Classification Search
   CPC ..... B62D 21/02; B62D 25/20; H01M 50/249; H01M 50/262; H01M 2220/20; Y02T 10/70
   USPC ........................................................ 180/68.5
   See application file for complete search history.

(56) References Cited

U.S. PATENT DOCUMENTS

| | | | |
|---|---|---|---|
| 2014/0284125 A1* | 9/2014 | Katayama | B60L 58/21 180/68.5 |
| 2018/0194212 A1* | 7/2018 | Hamilton | B60N 2/015 |
| 2019/0047419 A1 | 2/2019 | Kellner et al. | |
| 2019/0217695 A1 | 7/2019 | Hofer | |
| 2022/0017152 A1 | 1/2022 | Kecalevic et al. | |
| 2022/0176791 A1 | 6/2022 | Danneberg et al. | |
| 2022/0258586 A1 | 8/2022 | Amsz et al. | |

FOREIGN PATENT DOCUMENTS

| | | |
|---|---|---|
| DE | 10 2018 132 255 A1 | 6/2020 |
| DE | 10 2019 107 504 A1 | 10/2020 |
| DE | 10 2019 123 845 A1 | 3/2021 |
| EP | 2 468 609 A2 | 6/2012 |
| EP | 2 568 609 A2 | 3/2013 |
| EP | 3 511 184 A1 | 7/2019 |

OTHER PUBLICATIONS

International Search Report (PCT/ISA/210) issued in PCT Application No. PCT/EP2021/085853 dated Apr. 5, 2022 with English translation (4 pages).
German-language Written Opinion (PCT/ISA/237) issued in PCT Application No. PCT/EP2021/085853 dated Apr. 5, 2022 (6 pages).
German-language Search Report issued in German Application No. 10 2020 133 961.5 dated Nov. 24, 2021 (11 pages).

* cited by examiner

ENERGY STORE FLOOR ASSEMBLY FOR AN ELECTRICALLY DRIVABLE MOTOR VEHICLE

BACKGROUND AND SUMMARY

The invention relates to an energy store floor assembly for an electrically drivable motor vehicle. The invention furthermore relates to a method for producing such an energy store floor assembly.

A motor vehicle body having a floor assembly with respective crossbeams which in the vehicle transverse direction extend between the respective sills and on the lower side of which a vehicle floor of the motor vehicle body is disposed is already known from EP 2 568 609 A2. A store housing of an energy store installation is disposed on the lower side of the floor assembly, or of the vehicle floor, the store housing being disposed in a trough which on the upper side by the vehicle floor and circumferentially by the respective sills, or a front and a rear crossbeam, respectively.

A housing upper part of the store housing here runs below the vehicle floor, close to or so as to bear against the latter, so that a high weight and high costs have to be assumed for the energy store floor assembly as a consequence of this double floor. Moreover, in the event of servicing the energy store installation, the store housing first has to be removed from the upper-side floor assembly, and subsequently the housing upper part has to be opened in order to gain access to the energy store installation.

It is, therefore, an object of the present invention to provide an energy store floor assembly of the type mentioned at the outset and a method for producing an energy store floor assembly of this type by means of which significant synergetic effects in terms of the weight and the costs can be achieved, and by means of which the energy store installation is accessible in a more favorable fashion in the event of servicing.

This object is achieved according to the invention by an energy store floor assembly and by a method for producing an energy store floor assembly of this type having the features of the independent claims. Advantageous design embodiments with expedient refinements in the invention are the subject matter of the dependent claims.

The energy store floor assembly according to the invention comprises a floor assembly, assigned to the motor vehicle body, with respective crossbeams which extend between respective sills and on the lower side of which a vehicle floor is disposed, as well as an electric store installation which is disposed below the vehicle floor and is received in a multiple-part store housing.

In order to achieve in that respect an energy store floor assembly which is particularly favorable in terms of weight and easy to produce, it is provided according to the invention that a housing upper part of the store housing forms the vehicle floor of the floor assembly and by way of at least one gas-tight connection is connected to at least one housing lower part so as to form the store housing which on the lower side of the crossbeams is fastened to the floor assembly only following the formation of the store housing. It is consequently a core concept of the invention that the housing upper part of the store housing is used as the floor assembly, at least in a sub-region of the latter, for example in the region of a main floor of the passenger cell, which extends from a front bulkhead up to a rear heel board, for example. It goes without saying that the complete vehicle floor, thus including the main floor and the rear floor, may also be formed by the housing upper part of the store housing.

It is a substantial advantage here that the housing upper part of the store housing accordingly is assigned a dual use, specifically the encapsulation of the energy store installation on the upper side, on the one hand, and the formation of the vehicle floor, on the other hand. As a result, significant savings in terms of weight and costs can be made because, in contrast to the prior art known to date, a double floor—formed from the vehicle floor and the housing upper part—is no longer present, but only a single component.

It is furthermore a great advantage here that the housing upper part by way of at least one gas-tight connection is first connected to at least one housing lower part so as to form the store housing and thus to encapsulate the energy store installation, before this store housing is fastened to the floor assembly on the lower side of the crossbeams. In this way, the tightness test of the store housing can specifically take place already during the production of the latter, whereafter the store housing can then be connected to the floor assembly in the so-called marriage. This also makes a significant contribution to lowering assembly costs.

It has proven particularly advantageous here for the housing upper part to be produced from a plastics material. This can be, for example, a fiber-reinforced plastics material which has been produced by an SMC method or a liquid resin molding method, or it can be an organic sheet, for example. Plastics materials of this type advantageously have highly rated mechanical characteristics which are highly advantageous in the region of the vehicle floor.

The housing upper part may also be composed of aluminum or steel.

A further advantageous embodiment provides that the housing lower part is releasably connected to the housing upper part which is non-releasably fastened to the lower side of the crossbeams. As a result of the housing lower part being releasable from the housing upper part in such a manner, it is possible, for example in the event of servicing, when the energy store installation must be accessible, to open the store housing in a simple manner without the housing upper part having to be removed from the motor vehicle body-in-white, or the floor assembly proximal to the body-in-white. Rather, the housing upper part advantageously remains on the motor vehicle body, or the floor assembly.

A further advantageous embodiment of the invention provides that respective connection elements, into which respective fastening elements, in particular screw elements, are able to be driven from the direction of the housing lower part and/or from the direction of the housing upper part, extend between the housing lower part and the housing upper part. As a result of mechanical fastening elements of this type, particularly favorable fixing of the housing upper part to the motor vehicle body, on the one hand, and a particularly favorable removability of the housing lower part from the housing upper part, or from the floor assembly, on the other hand, can be guaranteed. However, other fastening possibilities are also conceivable as alternatives thereto. In this way, it is conceivable in particular for the housing upper part also to be otherwise connected to the floor assembly, for example by way of a corresponding connection by a joint.

In this context, it has furthermore been demonstrated to be advantageous if the connection elements are configured so as to be gas-tight in relation to the housing lower part and/or the housing upper part. As a result, the tightness of the store housing can be guaranteed prior to the driving in of respective screw elements, for example.

The advantages mentioned above in the context of the energy store floor assembly according to the invention apply in analogous manner to the method for producing such an energy store floor assembly according to the invention.

In this context, it has furthermore been demonstrated to be advantageous if the floor assembly is sealed by a sealing agent after the store housing has been fastened on the lower side of the crossbeams. In this way, a sealing agent, for example a PVC compound, is preferably applied according to the invention between the housing upper part and the crossbeams after the store housing has been fastened to the floor assembly, so that the passenger cell, or the vehicle floor, is sealed toward the bottom. As a result, the housing upper part in functional terms has the same characteristics as a conventional vehicle floor.

A further advantageous embodiment of the invention provides that the housing lower part in the event of servicing by way of releasable fastening elements, in particular screw elements, is removed from the housing upper part, which is non-releasably fastened on the lower side of the crossbeams. In this way, the housing upper part can advantageously remain on the floor assembly, or the motor vehicle body, respectively.

In this context, it has furthermore been demonstrated to be advantageous if, in the event of servicing, the energy store installation is removed from the upper part, which is non-releasably fastened on the lower side of the crossbeams, conjointly with the releasable housing lower part. In this way, the energy store installation is likewise removed from the floor assembly when the housing lower part is being removed, so that the energy store installation can correspondingly be subjected to servicing or replacement.

According to one preferred refinement of the energy store floor assembly, the gas-tight store housing is—releasably or non-releasably—fitted to the floor assembly. However, the store housing is in particular not a constituent part of a body-in-white of the motor vehicle, whereas the sills and the crossbeams are constituent parts of the body-in-white of the motor vehicle. The gas-tight store housing is thus fitted to the body-in-white of the motor vehicle. As is customary in the automotive sector, those elements of the body, in particular the body panels, which are connected to one another in a materially integral manner, in particular by welding, are referred to as the body-in-white. The body-in-white is then painted before the body of the motor vehicle is moved onto an assembly line of the motor vehicle. In other words, the gas-tight store housing is fitted to the painted body, or the painted floor assembly, whether releasably or non-releasably.

The vehicle floor is in particular not a constituent part of the, in particular painted, body, or of the, in particular painted, floor assembly, but rather of the store housing.

A tightness test of the store housing is preferably carried out prior to the step of fastening the gas-tight store housing to the floor assembly, on the lower side of the crossbeams.

Further features of the invention are derived from the claims, the figures and the description of the figures. The features and combinations of features mentioned above in the description, and the features and combinations of features mentioned hereunder in the description of the figures and/or shown solely in the figures can be used not only in the respective combination set forth but also in other combinations or individually.

The invention will now be explained in more detail by means of preferred exemplary embodiments and with reference to the drawings.

BRIEF DESCRIPTION OF THE DRAWINGS

FIGS. 3a, b, c show respective sectional views of the energy store floor assembly according to the invention along a section plane running in the vehicle transverse direction, or in the vehicle height direction, respectively, wherein FIG. 3a shows the floor assembly in a manner analogous to FIG. 1b, and the store housing in a manner analogous to FIG. 2, prior to assembly; FIG. 3d shows the floor assembly and the store housing after this marriage.

DETAILED DESCRIPTION OF THE DRAWINGS

Figure 1A:
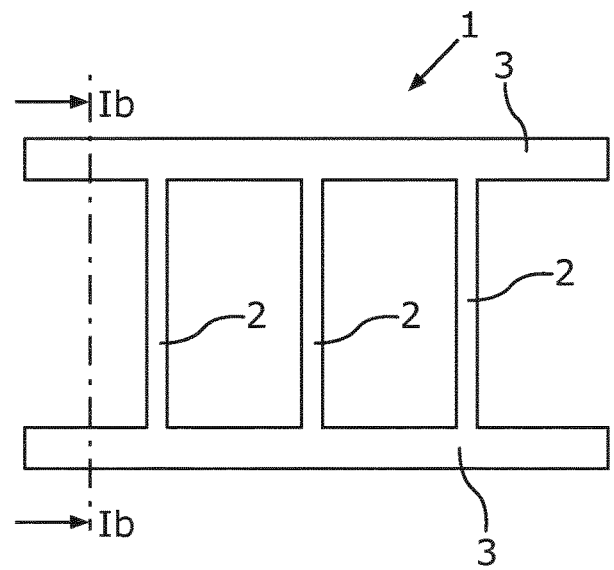
FIGS. 1a, b show a schematic top view of respective crossbeams of a body-proximal floor assembly of a passenger motor vehicle, which extend between sills on each side of the vehicle, and a schematic sectional view, enlarged in comparison to FIG. 1a, along a section plane which is indicated by the line Ib-Ib in FIG. 1a and runs in the vehicle transverse direction, or in the vehicle height direction, respectively.

Illustrated in a schematic top view in FIG. 1a. are respective crossbeams 2 of a floor assembly 1 of a body of an electrically drivable passenger motor vehicle, which crossbeams extend between a respective sill 3 on each side of the vehicle or are connected to the latter by way of a joint connection, for example, in particular a welded connection.

Figure 1B:
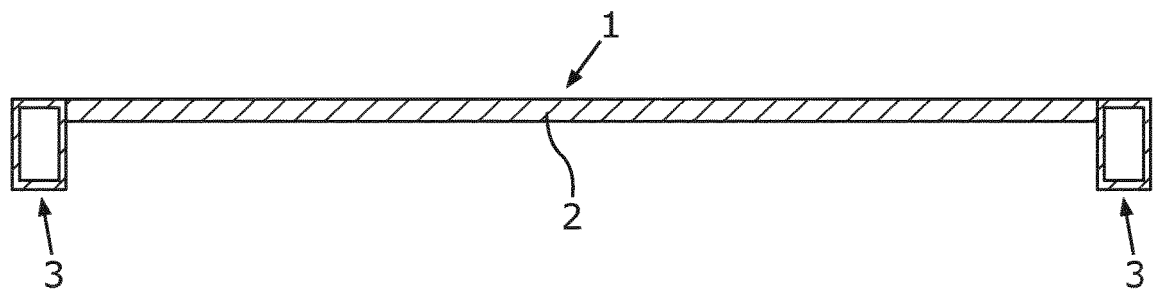

FIG. 1b shows the floor assembly illustrated in FIG. 1a in an enlarged sectional view along a section plane which is indicated by the line Ia-Ib in FIG. 1a and runs in the vehicle transverse direction, or in the vehicle height direction, respectively. It can be seen in particular from FIG. 1b that the crossbeams 2 adjoin in an upper region of the sills 3.

At least one of the crossbeams 2 can be configured as a seat crossbeam, for example, or the like. Other transverse elements such as, for example, a heel board or the like, are also contemplated instead of the crossbeams 2.

Figure 2:
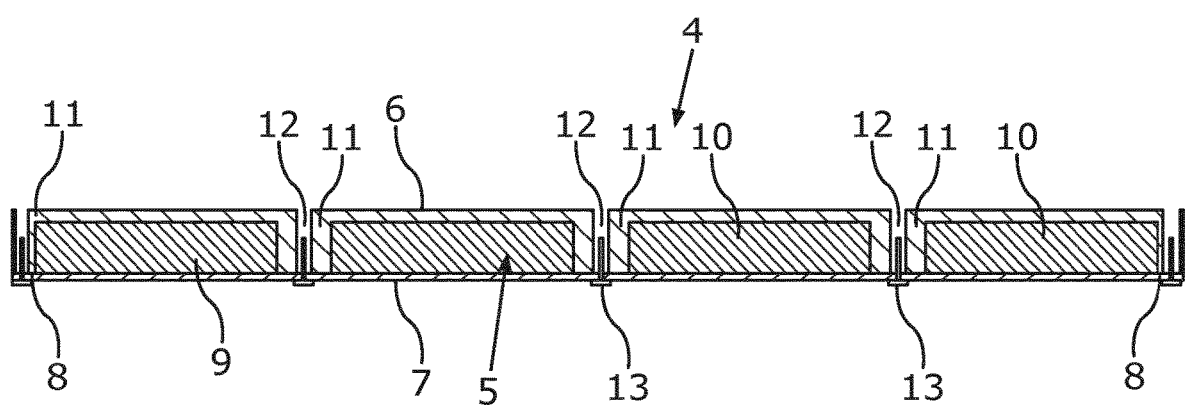
FIG. 2 shows a schematic sectional view through a store housing of an electric energy store installation prior to fitting on the lower side of the floor assembly shown in FIGS. 1a and 1b, along a section plane which runs in the vehicle transverse direction, or in the vehicle height direction, respectively.

In FIG. 2, a store housing 4 for an electric energy store installation 5 is illustrated in a schematic sectional view along a section plane which, in a manner analogous to FIG. 1b, runs in a vehicle transverse direction or in a vehicle height direction, respectively. This store housing 4 comprises in particular at least one housing upper part 6 and a housing lower part 7, which are connected to one another by an intervening and only schematically indicated gas-tight connection 8. The gas-tight connection 8 can in particular be formed by a corresponding seal which encircles the external circumference of a flange connection or the like between the housing upper part 6 and the housing lower part 7 so that an interior space 9 of the store housing 4, in which the energy store installation 5 is accommodated, can be configured to be tight.

The energy store installation 5, in a manner known per se, comprises for example a plurality of battery modules 10 or the like, which are correspondingly interconnected. In the present case, respective connection elements 11 which extend between the housing lower part 7 and the housing upper part 6 are disposed between the individual rows of battery modules 10. These connection elements 11 can be, for example, threaded sleeves, profiles that run across the length or width of the store housing 4, cast domes or the like, which are preferably sealed in relation to the housing upper part 6, or the housing lower part 7, respectively. In the present case, respective connection elements 11 are also provided on the external side here. If these connection elements 11 are configured as strips, for example, the connection elements 11 can then also represent the external-side delimitation of the store housing 4. This means that the housing upper part 6 and the housing lower part 7 are connected to one another, optionally also with the intervention of the respective connection element 11, or with the intervention of a respective gas-tight connection 8 between the respective end housing part 6, 7 and the respective connection element 11, so that overall a tightly closed store housing 4 is formed in turn.

The connection elements 11 in the present case are penetrated by respective openings 12 which here are configured as through openings, for example. Respective fastening elements 13, in particular screws, are able to be driven or fastened in a similar manner in these openings 12 from below, so that the end housing lower part 7 can be connected to the connection elements 11 by way of these screws 13. Likewise, corresponding fastening elements in the form of screws are able to be driven into the openings 12 from above, as will yet be explained in more detail below when viewed in combination with FIG. 3b.

In the present method for producing the energy store floor assembly, it is accordingly provided that the floor assembly 1 with the crossbeams 2 and the sills 3 is initially produced without the vehicle floor, and the energy store installation 5 with the store housing 4 is produced in a separate battery production, on the other hand. In the context of this battery production, a completed energy store is produced, wherein the energy store installation 5 composed of the multiplicity of battery modules 10, for example, is integrated in the store housing 4, and the latter is subsequently subjected to a tightness test.

Figure 3A:
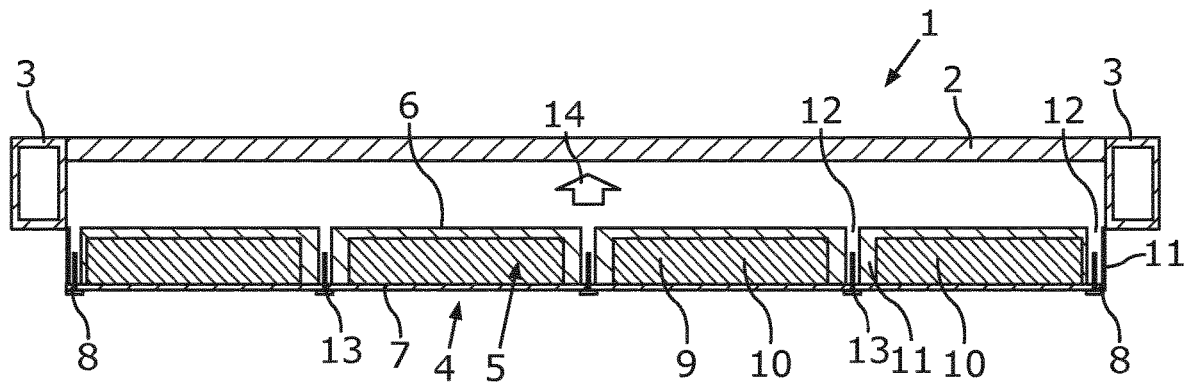
Figure 3B:
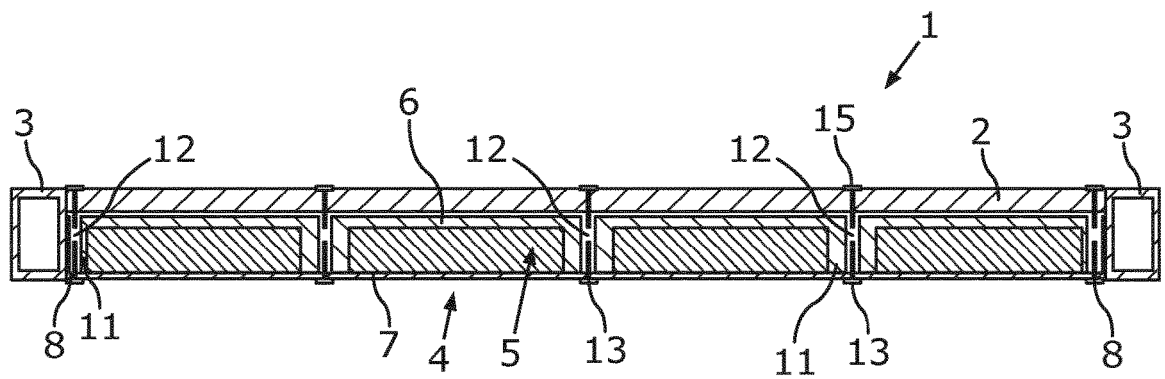

By means of FIGS. 3a and 3b, which in a manner analogous to FIGS. 1b and 2 show a schematic sectional view along a section plane of the floor assembly 1, or of the store housing 4 with the energy store installation 5, respectively, that runs along a vehicle transverse direction, or in the vehicle height direction, respectively, it can be seen that, in the further production method, the store housing 4 having the energy store installation 5 received therein is fitted on the lower side of the floor assembly 1. This takes place in the context of the so-called marriage during the assembly of the passenger motor vehicle. As is indicated by the arrow 14, the store housing 4 here is offered up from below to the crossbeams 2 of the floor assembly 1 and subsequently correspondingly fixed thereto, as is indicated by corresponding fastening elements 15 in FIG. 3b. In the process, the fastening elements 15 are screwed into the through openings 12 of the connection elements 11. Of course, other manners of fixing are also conceivable. Connections by joints between the housing upper part 6 of the store housing 4 and the respective crossbeams 2 are in particular also conceivable. A connection between the store housing 4 and the sills 3 is also possible.

When forming the present energy store floor assembly composed of the floor assembly 1 and the store housing 4, it is however essential that the housing upper part 6 forms at least a sub-region of the vehicle floor. In contrast to the prior art to date, in which the vehicle floor is always disposed on the floor assembly 1 so as to be on the lower side of the respective crossbeams 2, in the present case the vehicle floor, at least in a sub-region, is accordingly formed by the housing upper part 6 of the store housing. To this end, the housing upper part 6 in an obvious fashion is fixed on the lower side of the crossbeams 2. The housing upper part 6 here can in particular form a main floor in the region of the passenger cell of the passenger motor vehicle, the main floor extending from a front bulkhead, or a pedal floor, respectively, rearward up to a heel board at which the main floor usually transitions to a rear floor. If a larger energy store is envisaged for the passenger motor vehicle, the housing upper part 6 can however also form the rear floor. Of course, other vehicle floors which are not subdivided into a main floor and a rear floor are also able to be configured by the housing upper part 6. It is essential only that the housing upper part 6 at least partially or completely forms the vehicle floor so as to be imparted a dual use, specifically the formation of the vehicle floor, on the one hand, and the formation of the upper side of the store housing 4, on the other hand.

Figure 3C:
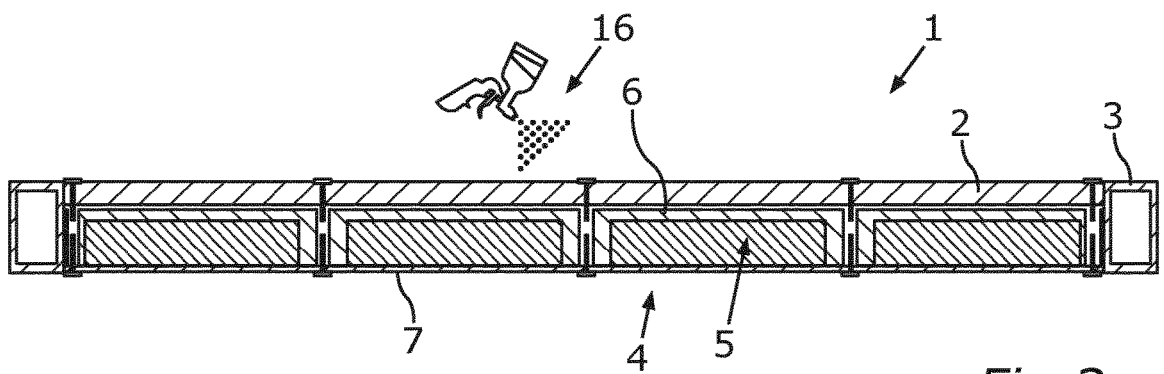
FIG. 3c symbolizes a method step subsequent to the marriage, in which the store housing fastened on the lower side of the body-proximal floor assembly, or the housing upper part thereof, is correspondingly sealed after the marriage.

According to FIG. 3c, which in a manner analogous to FIG. 3b shows the energy store floor assembly in the completed state in which the store housing 4 is fastened on the lower side of the floor assembly 1, it can be seen that the floor assembly 1 is sealed by a sealing agent 16 after the store housing 4 has been fastened. This sealing agent can be, for example, a PVC compound or else a seal of another type. For example, it would also be conceivable for the housing upper part 6 to be adhesively bonded to the floor assembly 1, the adhesive here forming the seal.

The housing upper part 6 is non-releasably connected to the floor assembly 1, or the crossbeams 2 and the sills 3, in particular by this sealing agent 16. Thereafter, the passenger cell of the passenger motor vehicle can be equipped with the interior in the customary fashion.

Figure 4:
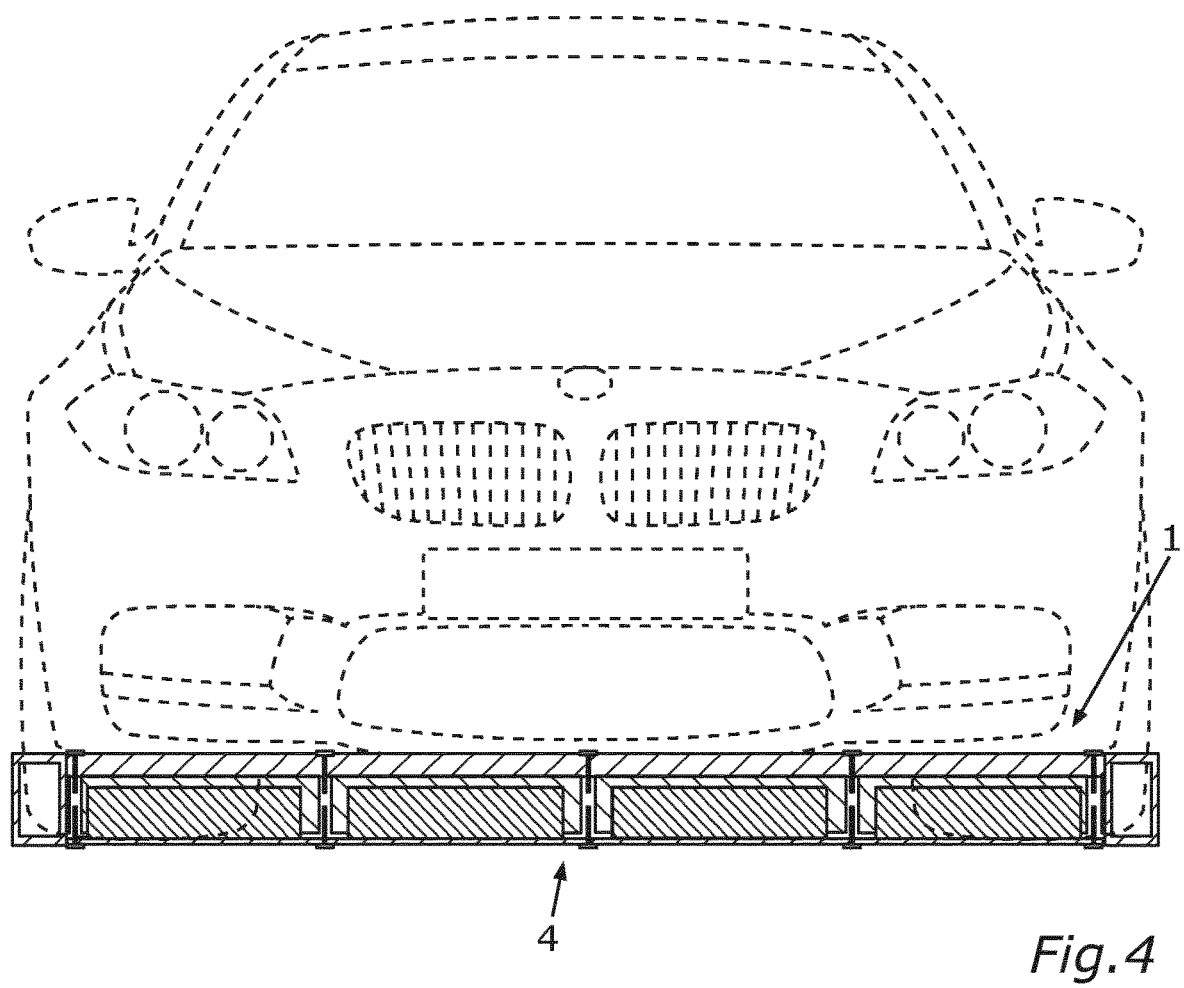
FIG. 4 shows a schematic illustration of the energy store floor assembly shown in a sectional view in a manner analogous to FIG. 3b, in the fundamental arrangement thereof on an electrically drivable passenger motor vehicle.

FIG. 4 shows in a schematic illustration the electrically drivable passenger motor vehicle having the energy store floor assembly shown in a schematic and symbolic sectional view in a manner analogous to FIGS. 3b and 3c. Consequently, FIG. 4 once again shows, only in an extremely schematic manner, the underfloor arrangement of the store housing 4 having the energy store installation 5 on the lower side of the floor assembly 1.

Figure 5:
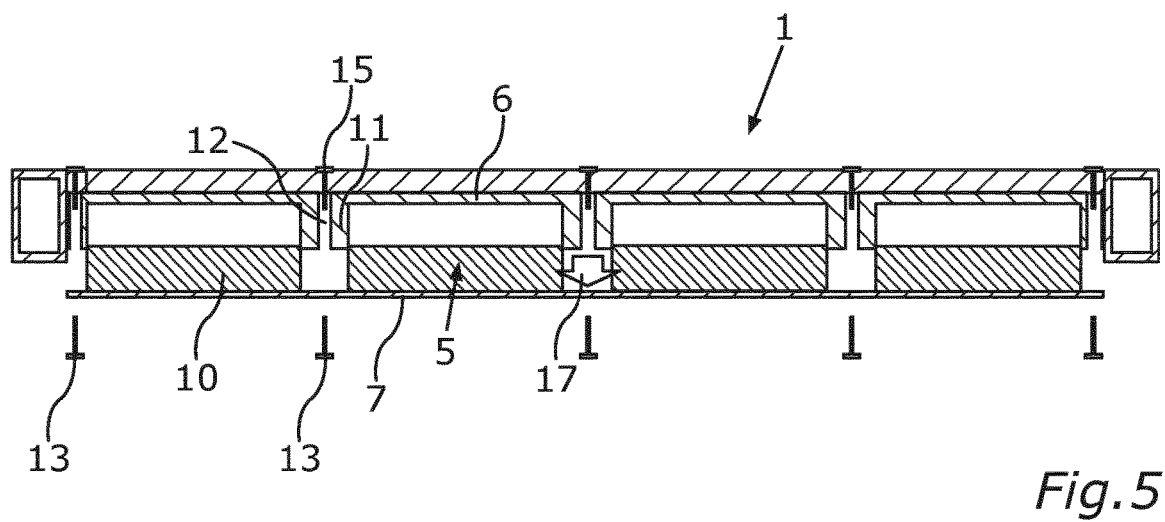
FIG. 5 shows a further sectional view of the energy store floor assembly along a section plane running in the vehicle transverse direction, or in the vehicle height direction, respectively, in a manner analogous to FIGS. 3a to 3c, wherein, in this case, a disassembly—as would be envisaged in the event of servicing—of the housing lower part and of the energy store installation disposed thereon from the housing upper part established on the body is indicated.

FIG. 5 finally shows a further sectional view through the energy store floor assembly, in a manner analogous to FIGS. 3b to 4. It is highlighted here that the housing lower part 7 in the event of servicing, for example when a malfunction, wear or similar damage to the energy store installation 5 is envisaged, by way of the releasable fastening elements 13 can be removed from the housing upper part 6, which is disposed on the lower side of the crossbeam 2 and non-releasably fastened to the floor assembly 1, according to an arrow 17.

Consequently, after the screws 15 have been released, the gas-tight connection 8 between the housing upper part 6 and the housing lower part 7 has only to be opened or optionally destroyed in order to access the energy store installation 5. The energy store installation preferably rests on the housing lower part 7 such that the latter, in the event of servicing, can be removed conjointly with the releasable housing lower part 7. In a somewhat more complex embodiment, it would however also be conceivable for the energy store installation 5, or the respective battery modules 10, respectively, to be disposed on the housing upper part 6. However, the battery modules 10 are preferably removable conjointly with the housing lower part 7. After corresponding repairs or a replacement of a part or the entire energy store installation 5 have/has been carried out, the housing lower part 7, optionally with the battery modules 10 of the energy store installation 5 disposed thereon, can then again be offered up to the housing upper part 6 and connected to the latter so as to complete the store housing 4, or the energy store, again. Of course, the gas-tight connection 8 between the two housing parts 6 and 7 has to be re-established in the process. As a result of the housing lower part 7 being releasable from the housing upper part 6, which is non-releasably connected to the floor assembly 1, there is consequently the significant advantage that corresponding accessibility to the energy store installation 5 in the event of servicing is provided in a simple manner.

Figure 6:
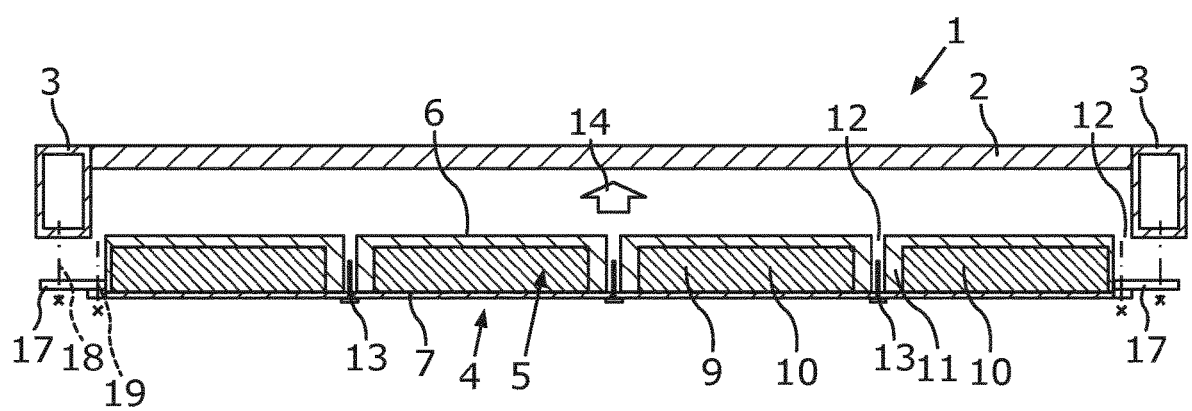
FIG. 6 shows a sectional view of the energy store floor assembly according to the invention according to a further embodiment of the invention, along a section plane running in the vehicle transverse direction, or in the vehicle height direction, respectively.

FIG. 6 shows a sectional view of the energy store floor assembly according to the invention in accordance with a further embodiment of the invention, in a manner analogous to FIG. 3a, along a section plane running in the vehicle transverse direction, or in the vehicle height direction, respectively. In contrast to the preceding embodiment, the housing upper part 6 here has respective lateral flanges 17 by means of which the housing upper part 6 and thus the entire store housing 4 can be established fixed on the lower side of the respective laterally assigned sill 3. The respective flange 17 of the housing upper part 6 can thus be fastened on the lower side of the corresponding sill 3 by means of respective threaded connections 18 or other fastening means. This has the consequence that the screws 15 for fastening the housing upper part 6, or the store housing 4, to the crossbeams 2 can be dispensed with in this instance. In this way the screw-driving direction of the overall housing 4 is able to be driven from below should access from above be impossible. It can moreover be seen that the housing lower part 7 on the periphery can be connected to the flanges 17 by way of threaded connections 19.

It is to be noted that the sectional illustrations of FIGS. 3a to 6 are illustrated in section planes that run through one of the crossbeams 2 of the body, and the housing upper part 6 in section planes deviating therefrom forms in each case the vehicle floor.

LIST OF REFERENCE SIGNS

1 Floor assembly
2 Crossbeam
3 Sill
4 Store housing
5 Energy store installation
6 End housing part
7 End housing lower part
8 Connection
9 Interior space
10 Battery modules
11 Connection element
12 Through openings
13 Fastening elements
14 Arrow
15 Fastening elements
16 Sealing agent
17 Flange

The invention claimed is:

1. An energy store floor assembly for an electrically drivable motor vehicle, comprising:
   crossbeams extending between respective sills of the floor assembly;
   a vehicle floor disposed on a lower side of the floor assembly;
   an electric energy store installation which is disposed below the vehicle floor and is received in a multiple-part store housing, wherein
   a housing upper part of the store housing forms the vehicle floor of the floor assembly and, by way of at least one gas-tight connection, is connected to at least one housing lower part so as to form the store housing which, on a lower side of the crossbeams, is fastened to the floor assembly,
   the housing upper part is fastened on the lower side of the crossbeams; and
   a sealing agent that seals the floor assembly after the store housing has been fastened on the lower side of the crossbeams.

2. The energy store floor assembly according to claim 1, wherein
   the housing upper part is a plastics material housing upper part.

3. The energy store floor assembly according to claim 1, wherein
   the housing upper part is non-releasably fastened on the lower side of the crossbeams.

4. The energy store floor assembly according to claim 1, wherein
   the electric energy store installation is connected to the housing lower part, which is releasably connected to the housing upper part.

5. The energy store floor assembly according to claim 1, wherein connection elements extending between spaced apart portions of the housing lower part and the housing upper part are configured so as to be gas-tight in relation to the housing lower part and/or the housing upper part.

6. The energy store floor assembly according to claim 1, wherein
   the store housing is gas tight and is fitted to the floor assembly and is not a constituent part of a body-in-white of the motor vehicle.

7. A method for producing an energy store floor assembly for an electrically drivable motor vehicle, having the floor assembly with respective crossbeams which extend between respective sills and on a lower side of which a vehicle floor is disposed, and having an electric energy store installation which is disposed below the vehicle floor and is received in a multiple-part store housing,
   the method comprising:
      connecting a housing upper part of the store housing, which forms the vehicle floor, to at least one housing lower part by way of a gas-tight connection so as to form a gas-tight store housing; and
      fastening the gas-tight store housing on the lower side of the crossbeams to the floor assembly, wherein
      the floor assembly is sealed by a sealing agent after the store housing has been fastened on the lower side of the crossbeams.

8. The method according to claim 7, wherein
the housing lower part, in an event of servicing by way of releasable connection elements, is removed from the housing upper part which is non-releasably fastened on a lower side of the crossbeams.

9. The method according to claim 7, further comprising:
carrying out a tightness test of the gas-tight store housing prior to the fastening of the gas-tight store housing on the lower side of the crossbeams to the floor assembly.

* * * * *